United States Patent
Riegler

(10) Patent No.: US 8,370,000 B2
(45) Date of Patent: Feb. 5, 2013

(54) SYSTEM AND METHOD FOR INCREASING THE POWER EFFICIENCY OF COOLING FANS

(75) Inventor: Robert Riegler, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 576 days.

(21) Appl. No.: 11/871,267

(22) Filed: Oct. 12, 2007

(65) Prior Publication Data

US 2009/0099792 A1   Apr. 16, 2009

(51) Int. Cl.
*G05D 23/00* (2006.01)
*G06F 1/20* (2006.01)
*G06F 1/26* (2006.01)

(52) U.S. Cl. .............. 700/300; 361/679.46; 361/679.47; 361/679.48; 713/320

(58) Field of Classification Search .................. None
See application file for complete search history.

(56) References Cited

U.S. PATENT DOCUMENTS

| | | | | |
|---|---|---|---|---|
| 5,438,226 A * | 8/1995 | Kuchta | ......................... | 307/125 |
| 5,457,516 A | 10/1995 | Kim | ............................. | 355/208 |
| 5,726,874 A | 3/1998 | Liang | ............................. | 363/141 |
| 5,796,580 A * | 8/1998 | Komatsu et al. | ......... | 361/679.48 |
| 5,848,282 A | 12/1998 | Kang | ...................... | 395/750.05 |
| 6,134,667 A * | 10/2000 | Suzuki et al. | ................ | 713/300 |
| 6,470,289 B1 | 10/2002 | Peters et al. | .................. | 702/132 |
| 6,540,479 B2 * | 4/2003 | Liao et al. | .................. | 415/199.5 |
| 6,612,817 B2 * | 9/2003 | Lin et al. | ..................... | 417/423.5 |
| 6,806,673 B2 | 10/2004 | Ho | ................. | 318/559 |
| 6,932,696 B2 | 8/2005 | Schwartz et al. | ............ | 454/184 |
| 6,950,969 B2 * | 9/2005 | Thompson et al. | ............. | 714/44 |
| 7,054,721 B2 * | 5/2006 | Malone et al. | ................ | 700/300 |
| 2005/0106026 A1 * | 5/2005 | Oosawa et al. | ........... | 416/198 R |
| 2008/0310967 A1 * | 12/2008 | Franz et al. | ..................... | 417/32 |

* cited by examiner

*Primary Examiner* — Jeffrey A Gaffin
*Assistant Examiner* — Sunray Chang
(74) *Attorney, Agent, or Firm* — Baker Botts L.L.P.

(57) ABSTRACT

Systems and methods for increasing the power efficiency of cooling fans are disclosed. A method for providing power-efficient operation of a plurality of cooling fans may include testing a plurality of cooling fans over an operating range of delivered airflow to determine, in each of one or more regions of the operating range, a number of cooling fans to be enabled to provide the lowest power amount required to deliver the delivered airflow for such region.

9 Claims, 2 Drawing Sheets

SYSTEM AND METHOD FOR INCREASING THE POWER EFFICIENCY OF COOLING FANS

TECHNICAL FIELD

The present disclosure relates in general to information handling systems, and more particularly increasing the power efficiency of cooling fans in information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As processors, graphics cards, random access memory (RAM) and other components in information handling systems have increased in clock speed and power consumption, the amount of heat produced by such components as a side-effect of normal operation has also increased. Often, the temperatures of these components need to be kept within a reasonable range to prevent overheating, instability, malfunction and damage leading to a shortened component lifespan. Accordingly, cooling fans have often been used in information handling systems to cool information handling system components.

In certain applications, information handling systems may include a plurality of redundant cooling fans to ensure adequate cooling in the event of a mechanical failure of a single fan. However, provision of multiple cooling fans may increase power requirements of an information handling system.

SUMMARY

In accordance with the teachings of the present disclosure, the disadvantages and problems associated with power consumption in redundant cooling fans have been substantially reduced or eliminated.

In accordance with one embodiment of the present disclosure, a method for providing power-efficient operation of a plurality of cooling fans is provided. A plurality of cooling fans may be tested over an operating range of delivered airflow to determine, in each of one or more regions of the operating range, a number of cooling fans to be enabled to provide the lowest power amount required to deliver the delivered airflow for such region.

In accordance with another embodiment of the present disclosure, a cooling system may include a plurality of cooling fans and a control system communicatively coupled to the plurality of cooling fans. The control system may be configured to determine an airflow requirement and enable a number of cooling fans, such that the number of enabled cooling fans is operable to deliver the airflow requirement with a lower power requirement than another number of cooling fans.

In accordance with another embodiment of the present disclosure, an information handling system may include a processor, a memory communicatively coupled to the processor, a plurality of cooling fans, and a control system communicatively coupled to the processor. The control system may be configured to determine an airflow requirement and enable a number of cooling fans, such that the number of enabled cooling fans is operable to deliver the airflow requirement with a lower power requirement than another number of cooling fans.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

Figure 1:
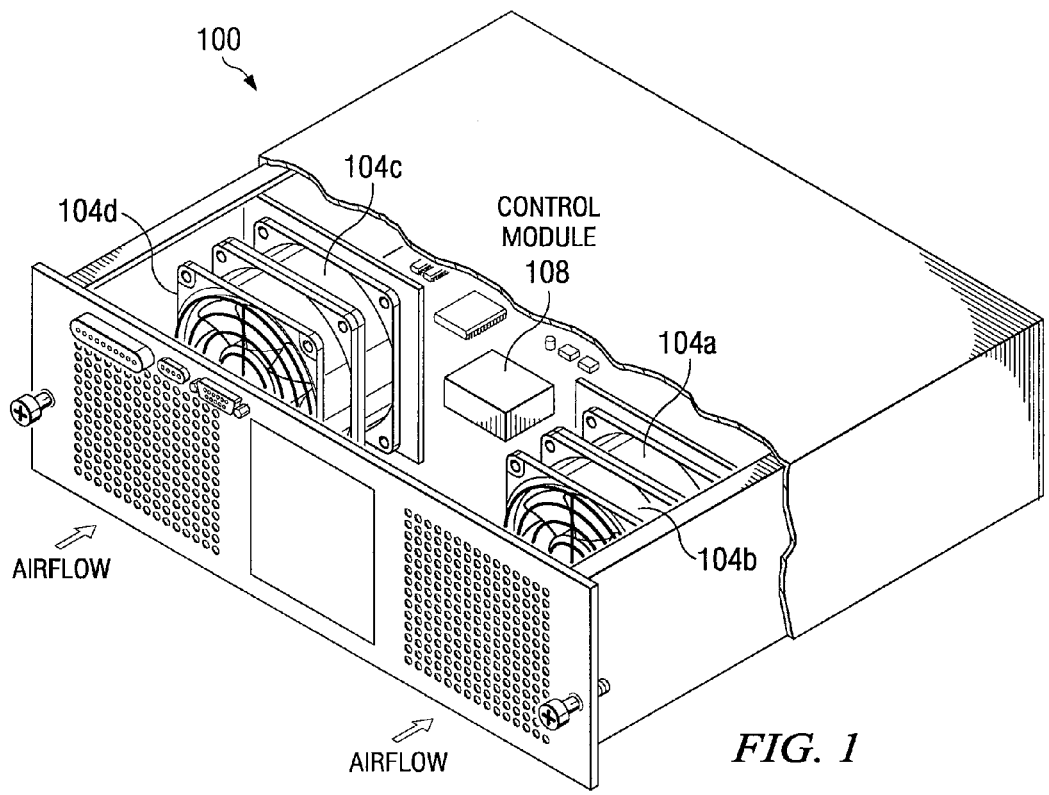
FIG. 1 illustrates a block diagram of an example information handling system having a control system for power-efficient operation of cooling fans, in accordance with the present disclosure.

FIG. 1 illustrates a block diagram of an example information handling system 100 having a control module 108 for power-efficient operation of cooling fans 104 in accordance with the present disclosure. As depicted in FIG. 1, information handling system 100 may include a chassis 102 having a plurality of cooling fans 104a-d and a control module 108. Chassis 102 may be an enclosure that serves as a container for various components of information handling system 100, and may be constructed from steel, aluminum, plastic, and/or any other suitable material. Although the term "chassis" is used, chassis 102 may also be referred to as a case, cabinet, tower, box, enclosure, and/or housing.

Each of cooling fans 104 may be any mechanical or electromechanical fan used for cooling purposes. In certain embodiments, fans 104 may draw cool air into chassis 102 from the outside, expel warm air from inside chassis 102, and/or move air across a heatsink to cool one or more particular components of information handling system 100. As depicted in FIG. 1, cooling fans 104 may form a redundant cooling fan array. A redundant cooling fan array may permit continued cooling of information handling system 100 in the event that one or more of fans 104 fails. For example, if fan 104d were to fail, fans 104a-c may remain available to provide sufficient cooling to information handling system 100. Also as depicted in FIG. 1, two or more of cooling fans 104 may be configured such that they are fluidically coupled in series, that is the flow outlet of one fan 104 feeds the flow inlet of another fan 104. For example, fans 104a and 104b may be configured in series, and fans 104c and 104d may be configured in series. Often, two fans in series may be capable of delivering more air pressure as compared to equivalent fans configured in parallel.

Although information handling system 100 is depicted as including four fans 104, information handling system 100 may include any number of fans 104. In addition, although a particular configuration of fans 104 is depicted, fans 104 may be configured in any suitable manner (e.g., fans 104 all in series, fans 104 all in parallel, and any combination of fans in parallel and series).

Control module 108 may include any system, device or apparatus operable to monitor airflow requirements of information handling system 100 and control the operation of one or more fans 104 based at least on such monitored airflow requirements. For example, in some embodiments, control system 108 may be operable to monitor information handling system 100 and determine its airflow requirements based on the configuration, system stress, ambient temperature, and/or other suitable parameters associated with information handling system 100. Based on the determined airflow requirements, control system 108 may be operable to determine the number of fans required to deliver the airflow requirements to information handling system 100.

As a specific, non-limiting example, reference is made to the configuration of fans 104 depicted in FIG. 1. Due to the configuration, control system 108 may determine that at all times, at least one of fans 104a and 104b and at least one of fans 104c and 104d must be enabled, so as to provide substantially similar airflow on both the left and right sides of information handling system 100. In the same or alternative embodiments, control system 108 may determine that if all fans 104a-d are functional, the cumulative airflow delivered by fans 104a and 104b should be approximately equal to the cumulative airflow delivered by fans 104c and 104d, again to provide substantially similar airflow on both the left and right sides of information handling system 100. Furthermore, in the same or alternative embodiments, control system 108 may monitor system stress of information handling system 100 (e.g., processor utilization, memory utilization, and/or utilization of other components of information handling system 100) and/or the ambient temperature of information handling system 100 to determine the cumulative airflow to be delivered to information handling system 100. Based on the determined airflow requirements, control system 108 may appropriately enable, disable, and/or control the fan speed of fans 104 in order to provide the required airflow.

Control system 108 may be implemented in hardware, software, or any combination thereof. In certain embodiments, control system 108 may be implemented partially or fully in software embodied in computer-readable media.

Figure 2:
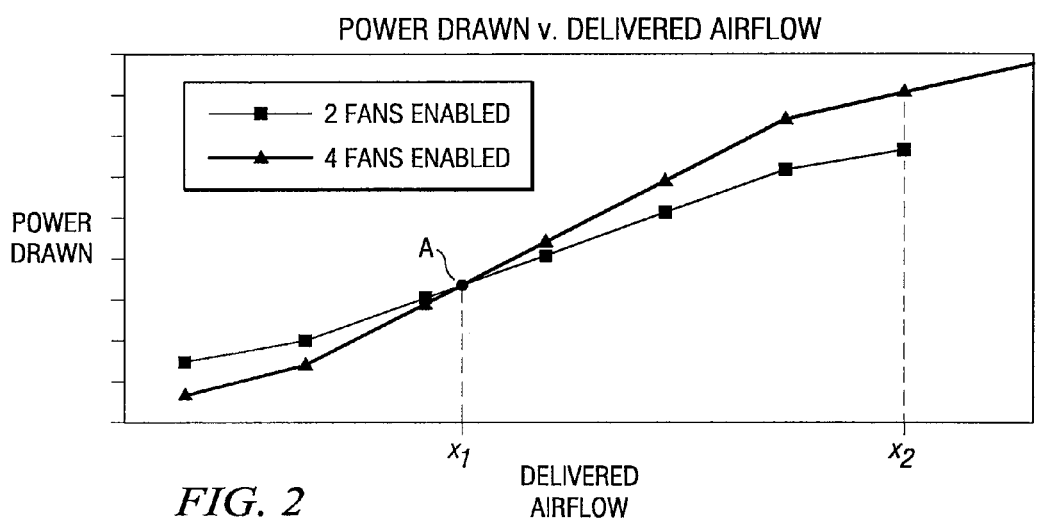
FIG. 2 illustrates an example graph of power drawn versus delivered airflow for an embodiment of the information handling system depicted in FIG. 1.

FIG. 2 illustrates an example graph of power drawn versus delivered airflow for fans 104 in an embodiment of information handling system 100 depicted in FIG. 1. Specifically, FIG. 2 depicts an example graph showing power drawn versus delivered airflow when two fans (e.g., fans 104a and 104c) are enabled, and power drawn versus delivered airflow when four fans (e.g., fans 104a-d) are enabled, for a particular embodiment of information handling system 100. In the depicted embodiment, the power drawn by fans 104 increases as the delivered airflow increases. As seen in the graph, at certain levels of delivered airflow, fans 104 may deliver airflow more efficiently with only two fans enabled, while at other levels of delivered airflow, fans 104 may deliver airflow more efficiently with four fans enabled.

To further illustrate, as shown in FIG. 2, at a delivered airflow of less than $x_1$, four fans 104 may be able to deliver the airflow with a lower power consumption than the power consumption required for two fans 104 to deliver an equivalent airflow. However, at an airflow of more than $x_1$, two fans 104 may be able to deliver the airflow with a lower power consumption than the power consumption required for four fans 104 to deliver an equivalent airflow. Thus, to the left of point A in FIG. 2, four-fan operation may be more power efficient than two-fan operation, and to the right of point A, two-fan operation may be more power efficient than four-fan operation. FIG. 2 also depicts that at delivered airflows of greater than $x_2$, two fans may not be sufficient to deliver such airflow, while four fans may be sufficient to deliver such airflow.

Accordingly, to provide the most power efficient operation for the embodiment depicted in FIG. 2, four fans 104 should be enabled for airflows below $x_1$, two fans 104 should be enabled for airflows between $x_1$ and $x_2$, and four fans 104 should be enabled for airflows above $x_2$.

While FIG. 2 depicts power and airflow behavior for a particular embodiment of information handling system 100, fans 104 may exhibit similar or other power and airflow characteristics in other embodiments, and the values of $x_1$ and/or $x_2$, and/or the location of point A, may vary among embodiments. In addition, although FIG. 2 depicts power versus airflow curves that intersect at one point (A), the curves depicted may intersect more than once, or not at all.

Figure 3:
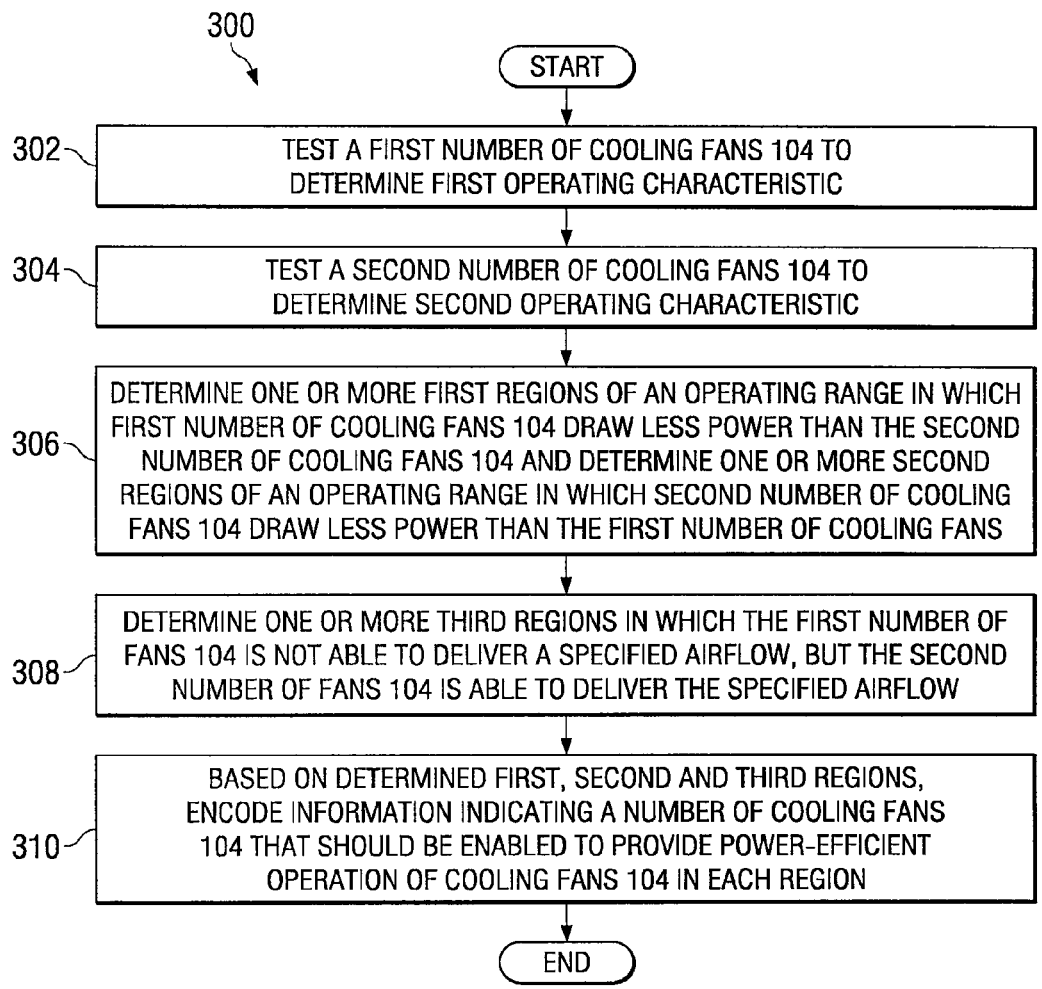
FIG. 3 illustrates a flow chart of an example method for determining optimum fan settings for a variety of airflow requirements in a cooling system comprising cooling fans.

FIG. 3 illustrates a flow chart of an example method 300 for determining optimum fan settings for a variety of airflow requirements in a cooling system comprising cooling fans 104. For simplicity, method 300 will be discussed with regard to its application to information handling system 100 as depicted in FIG. 1. However, method 300 and/or similar methods may be applied to any suitable information handling system with any number and/or configuration of fans. Method 300 and/or similar methods may also be applied to any other equipment and/or space that utilizes fan-based cooling.

According to one embodiment, method 300 preferably begins at step 302. As noted above, teachings of the present disclosure may be implemented in a variety of configurations of information handling system 100. As such, the preferred initialization point for method 300 and the order of the steps 302-310 comprising method 300 may depend on the implementation chosen.

At step 302, a first number of cooling fans 104 may be tested to determine a first operating characteristic, the first operating characteristic representative of the amount of power drawn versus the delivered airflow over a specified operating range for the first number of cooling fans. For example, at step 302, two cooling fans 104a and 104c may be tested to determine the amount of power drawn versus the delivered airflow over a specified operating range (e.g., the operating range depicted in FIG. 2).

At step 304, a second number of cooling fans 104 (wherein the second number if greater than the first number) may be tested to determine a second operating characteristic, the second operating characteristic representative of the power drawn versus the delivered airflow over a specified operating range for the second number of cooling fans. For example, at step 304, four cooling fans 104a-d may be tested to determine the amount of power drawn versus the delivered airflow over a specified operating range (e.g., the operating range depicted in FIG. 2).

At step 306, the first characteristic and the second characteristic may be compared to determine one or more first regions of the operating range in which the first number of cooling fans draw less power than the second number of cooling fans (e.g., the range between $x_1$ and $x_2$ depicted in FIG. 2) and to determine one or more second regions of the operating range in which the second number of cooling fans draw less power than the first number of cooling fans (e.g., the range below $x_1$ depicted in FIG. 2).

At step 308, the first characteristic and the second characteristic may be compared to determine one or more third regions in which the first number of fans is not able to deliver the specified airflow, but the second number of fans is able to deliver the specified airflow (e.g., the range above $x_2$ depicted in FIG. 2).

At step 310, based on at least one of the determined first, second and third regions, information (e.g., instructions and/or data) may be encoded in control module 108 and/or another computer-readable medium of information handling system 100, wherein such information may indicate the number of cooling fans 104 that should be enabled for each region within the operating range of cooling fans 104 provide power-efficient operation of cooling fans 104 (e.g., the first number of fans in the first region, and the second number of fans in the second and third region). After completion of step 310, method 300 may end.

Although FIG. 3 discloses a particular number of steps to be taken with respect to method 300, it is understood that method 300 may be executed with greater or lesser steps than those depicted in FIG. 3. For example, in some embodiments, method 300 may include determining the power drawn versus delivered airflow characteristics of more than two numbers of cooling fans 104, and may include operational regions other than first regions, second regions, and third regions. In addition, although FIG. 3 discloses a certain order of steps to be taken with respect to method 300, the steps comprising method 300 may be completed in any suitable order. For example, in certain embodiments, step 302 may execute immediately before, after or substantially contemporaneous with step 304.

Method 300 may be implemented using information handling system 100 or any other system operable to implement method 300. In certain embodiments, method 300 may be implemented partially or fully in software embodied in computer-readable media.

Figure 4:
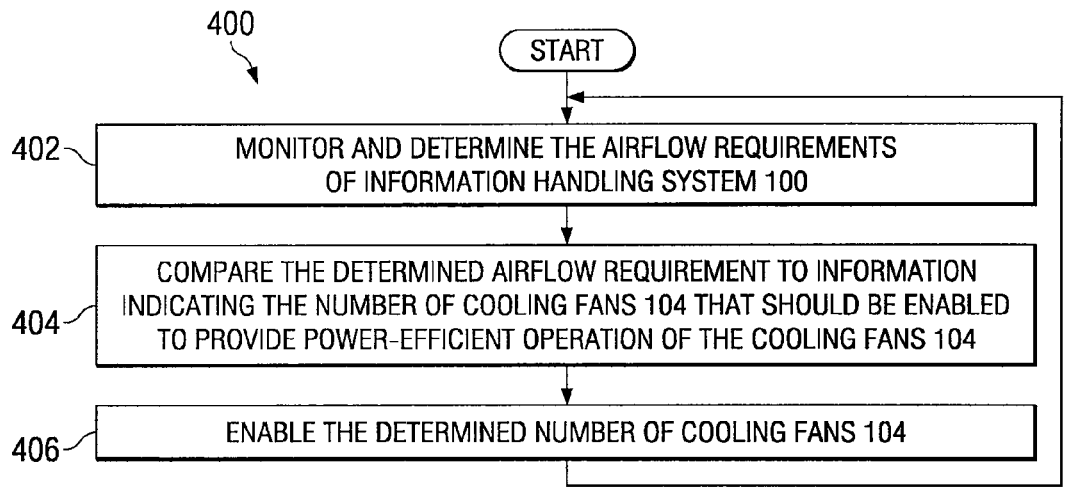
FIG. 4 illustrates a flow chart of an example method for enabling an optimum number of cooling fans based on an airflow requirement for an information handling system.

FIG. 4 illustrates a flow chart of an example method 400 for enabling an optimum number of cooling fans based on an airflow requirement for information handling system 100. For simplicity, method 400 will be discussed with regard to its application to information handling system 100 as depicted in FIG. 1. However, method 400 and/or similar methods may be applied to any suitable information handling system with any number and/or configuration of fans. Method 400 and/or similar methods may also be applied to any other equipment and/or space that utilizes fan-based cooling.

According to one embodiment, method 400 preferably begins at step 402. As noted above, teachings of the present disclosure may be implemented in a variety of configurations of information handling system 100. As such, the preferred initialization point for method 400 and the order of the steps 402-406 comprising method 400 may depend on the implementation chosen.

At step 402, control system 108 and/or another component of information handling system 100 may monitor and determine the airflow requirements of information handling system 100. For example, as discussed above, control system 108 and/or another component of information handling system 100 may monitor the configuration, system stress, ambient temperature, and/or other parameters associated with information handling system to determine the airflow requirements of information handling system 100.

At step 404, control system 108 and/or another component of information handling system 100 may compare the determined airflow requirement to information encoded in control module 108 and/or another computer-readable medium of information handling system 100 (e.g., the information encoded at step 310 of method 300), wherein such information indicates the number of cooling fans 104 that should be enabled to provide power-efficient operation of the cooling fans 104. For example, referring to FIG. 2, the information may indicate that a first number (e.g., two) of cooling fans 104 should be enabled for airflow requirements between $x_1$ and $x_2$, while a second number (e.g., four) of cooling fans 104 may be enabled otherwise. Based on such comparison, control system 108 and/or another component of information handling system 100 may determine a number of fans to be enabled.

At step 406 control system 108 and/or another component of information handling system 100 may enable the determined number of cooling fans 104 (e.g., by setting appropriate switches to provide or withdraw power delivered to individual cooling fans 104, or other suitable technique). The cooling fans 104 enabled at step 406 may be the same fans used in method 300, or may be another group of cooling fans 104 similar to those used in method 300. After completion of step 406, method 400 may proceed again to step 402, where the airflow requirements of information handling system 100 are again monitored.

Although FIG. 4 discloses a particular number of steps to be taken with respect to method 400, it is understood that method 400 may be executed with greater or lesser steps than those depicted in FIG. 4. For example, in some embodiments, method 400 may include determining the power drawn versus delivered airflow characteristics of more than two numbers of cooling fans 104, and may include operational regions other than first regions, second regions, and third regions. In addition, although FIG. 4 discloses a certain order of steps to be taken with respect to method 400, the steps comprising method 400 may be completed in any suitable order. Method 400 may be implemented using information handling system 100 or any other system operable to implement method 400. In certain embodiments, method 400 may be implemented partially or fully in software embodied in computer-readable media.

Using methods 300 and 400, the power consumption efficiency of a system of cooling fans 104 may be increased such that the cooling system may deliver the required airflow using the lowest power necessary. For example, applying methods 300 and 400 to a cooling system with power consumption characteristics similar to those depicted in FIG. 2, if the required airflow is below $x_1$, control system 108 and/or another component of information handling system may determine that the power required to provide the required airflow may be lower if more than the minimum number of fans 104 (two) are enabled. Alternatively, if the required airflow is above $x_1$ and below $x_2$, control system 108 and/or another component of information handling system may determine that the power required to provide the required airflow may not be lower if more than the minimum number of fans 104 (two) are enabled.

Using the methods and systems disclosed herein, problems associated with conventional approaches to redundant cooling fans in information handling systems may be improved, reduced, or eliminated. For example, the methods and systems disclosed herein allow for power-efficient operation of cooling fans, while also allowing for fans to deliver airflow to an information handling system in accordance with the information handling system's airflow requirements.

Although the present disclosure has been described in detail, it should be understood that various changes, substitutions, and alterations can be made hereto without departing from the spirit and the scope of the disclosure as defined by the appended claims.

What is claimed is:

1. A method for providing power-efficient operation of a plurality of cooling fans, comprising:
    testing a plurality of cooling fans at a plurality of speeds, over an operating range of delivered airflow to determine, in each of one or more regions of the operating range, a first number of cooling fans to be enabled, and, for each cooling fan enabled, a speed at which the cooling fan shall be operated, to deliver the delivered airflow for such region, the determination based on the first number of cooling fans operating with a lower power requirement than another power requirement of a second number of cooling fans to deliver the same delivered airflow for such region as the first number of cooling fans, wherein testing the plurality of cooling fans comprises;
    testing the first number of cooling fans at the plurality of speeds to determine a first operating characteristic, the first operating characteristic indicative of power drawn versus delivered airflow over the operating range for the first number of cooling fans;
    testing the second number of cooling fans at the plurality of speeds to determine a second operating characteristic, the second operating characteristic indicative of power drawn versus delivered airflow over the operating range for the second number of cooling fans;
    determining one or more first regions of the operating range in which the first number of cooling fans draw less power than the second number of cooling fans; and
    determining one or more second regions of the operating range in which the second number of cooling fans draw less power than the first number of cooling fans.

2. A method according to claim 1, comprising determining one or more third regions of the operating range in which the first number of cooling fans is insufficient to deliver the delivered airflow and the second number of cooling fans is sufficient to deliver the delivered airflow.

3. A method according to claim 1, comprising storing information on a computer-readable medium, the information:
    indicating the one or more first regions and the one or more second regions;
    indicating that the first number of cooling fans are to be enabled for delivered airflows in the one or more first regions to provide power-efficient operation; and
    indicating that the second number of cooling fans are to be enabled for delivered airflows in the one or more second regions to provide power-efficient operation.

4. A method according to claim 1, comprising, in a system comprising one or more cooling fans:
    determining an airflow requirement;
    enabling the first number of cooling fans if the airflow requirement is within the one or more first ranges; and
    enabling the second number of cooling fans if the airflow requirement is within the one or more second ranges.

5. A method according to claim 1, comprising, in a system comprising one or more cooling fans:
    determining an airflow requirement; and
    enabling the first number of cooling fans based upon a region of the operating range that includes the airflow requirement.

6. A cooling system comprising:
    a plurality of cooling fans; and
    a control system communicatively coupled to the plurality of cooling fans and configured to:
    determine an airflow requirement;
    test a first number of cooling fans at a plurality of speeds to determine a first operating characteristic, the first operating characteristic indicative of power drawn versus delivered airflow over an operating range for the first number of cooling fans;
    test the second number of cooling fans at the plurality of speeds to determine a second operating characteristic, the second operating characteristic indicative of power drawn versus delivered airflow over the operating range for the second number of cooling fans;
    determine one or more first regions of the operating range in which the first number of cooling fans draw less power than the second number of cooling fans;
    determine one or more second regions of the operating range in which the second number of cooling fans draw less power than the first number of cooling fans; and
    enable each the first number of cooling fans at a speed based on a determination that the first number of enabled cooling fans is operable to deliver the airflow requirement with a lower power requirement than the second number of cooling fans also operable to deliver the same airflow requirement as the first number of cooling fans.

7. A cooling system according to claim 6, the control system further operable to determine the first number of cooling fans to be enabled by comparing the determined airflow requirement to information embodied in computer-readable media, the information indicating for each of one or more regions of an operating range of delivered airflow, a number of cooling fans that should be enabled to provide the lowest power amount required to deliver the delivered airflow for such region.

8. An information handling system comprising:
a processor;
a memory communicatively coupled to the processor;
a plurality of cooling fans; and
a control system communicatively coupled to the processor and the cooling fans and configured to:
determine an airflow requirement;
test a first number of cooling fans at a plurality of speeds to determine a first operating characteristic, the first operating characteristic indicative of power drawn versus delivered airflow over an operating range for the first number of cooling fans;
test the second number of cooling fans at the plurality of speeds to determine a second operating characteristic, the second operating characteristic indicative of power drawn versus delivered airflow over the operating range for the second number of cooling fans;
determine one or more first regions of the operating range in which the first number of cooling fans draw less power than the second number of cooling fans;
determine one or more second regions of the operating range in which the second number of cooling fans draw less power than the first number of cooling fans; and
enable each of the first number of cooling fans at a speed based on a determination that the first number of enabled cooling fans is operable to deliver the airflow requirement with a lower power requirement than the second number of cooling fans also operable to deliver the airflow requirement.

9. An information handling system according to claim 8, the control system further operable to determine the first number of cooling fans to be enabled by comparing the determined airflow requirement to information embodied in computer-readable media, the information indicating for each of one or more regions of an operating range of delivered airflow, a number of cooling fans that should be enabled to provide the lowest power amount required to deliver the delivered airflow for such region.

* * * * *